United States Patent Office
2,831,828
Patented Apr. 22, 1958

2,831,828

RUBBER COMPOUNDING AND VULCANIZATE OF THE RESULTING PRODUCT

Marvin C. Brooks, Middlebury, Conn., and Roswell H. Ewart, Bloomfield, N. J., assignors to United States Rubber Company, New York, N. Y., a corporation of New Jersey No Drawing. Application February 1, 1955
Serial No. 485,612

8 Claims. (Cl. 260—41.5)

This invention relates to improvements in the art of Butyl rubber compounding and more particularly to a method whereby improved filler-reinforced Butyl rubber vulcanizates are obtained by the addition thereto of certain organic silicon-containing materials. The term "Butyl rubber" is used herein in its ordinary meaning to denote a solid sulfur-vulcanizable rubbery copolymer of a major proportion, i. e., from 80 to 99.5%, of isobutylene and a minor proportion, i. e., correspondingly from 20 to 0.5%, of an aliphatic conjugated diolefin hydrocarbon having 4 to 6 carbon atoms per molecule, especially butadiene or isoprene.

The present invention is based upon our discovery that the reinforcing properties of silica and silicate fillers in Butyl rubber can be improved greatly by incorporating certain organo-organoxysilanes with the filler and the elastomer. The organo-organoxysilanes of the present invention are the reaction products of selected halogen-reactive organic oxygen compounds and organohalosilanes. We particularly prefer to use those reaction products which contain substantially no hydrolyzable halogen and are free-flowing liquids at ambient temperatures. Such organo-organoxysilanes are easily incorporated in the rubber and filler mixture and enable the preparation of filled stocks having greater flexibility, higher tensile and greater cut-growth resistance.

The organohalosilanes which may be used in the preparation of the organo-organoxysilanes of the present invention are selected from the group consisting of—

Saturated aliphatic hydrocarbon halosilanes
Saturated cycloaliphatic hydrocarbon halosilanes
Cycloalkenylhalosilanes
Cycloalkenylalkylhalosilanes
Omega-alkenylhalosilanes in which the alkenyl group contains at least 6 carbon atoms.

The halogen-reactive oxygen compounds which are reacted with organohalosilanes to form the reaction products used in our invention are selected from the group consisting of—

Saturated aliphatic monohydric alcohols
Saturated aliphatic dihydric alcohols (including both hydrocarbon diols and hydrocarbon ether-diols)
Oxiranes having the formula

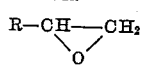

wherein R is hydrogen, methyl, or ethyl.

The reaction between the halogen-reactive chemical and the organohalosilane may be carried out in a variety of ways to produce the organo-organoxysilane reaction products operable in the process of the invention. Generally the preferable method of preparing the organo-organoxysilane will depend on the nature of the halogen-reactive material employed.

Thus, when dihydric alcohols are employed as the halogen-reactive component, the preferred method of making the reaction products is as described in U. S. Patent 2,680,124 to Brooks and in our copending United States patent application Serial No. 255,534, now Patent No. 2,715,135, which are expressly incorporated herein by reference. It is therein described how polymeric organo-organoxysilane reaction products which are liquids and free-flowing at ambient temperatures, are prepared. Hydrogen halide is evolved during the course of these reactions; the products are substantially free of hydrolyzable halogen.

When monohydric alcohols are used as the halogen-reactive ingredient, products containing substantially no hydrolyzable halogen are prepared by conventional procedures. These organo-organoxysilane products are monomeric, and are of definite known structure. Examples of such reaction products are ethyltriethoxysilane, cyclohexenyltripropoxysilane, etc.

When oxiranes are employed as the halogen-reactive ingredient they react directly with the organohalosilane by addition; the halogen of the silane becomes attached to the beta carbon atom of the oxirane, and the organosilyl becomes attached, through the oxygen atom, to the alpha carbon atom, an organo(chloroorganoxy)silane accordingly being formed as the reaction product. Hydrogen halide is not evolved in this reaction. Examples of such reaction products are propyltri-(2-chloroethoxy)-silane, cyclohexenyltri-(2-chloropropoxy)silane, etc.

All of the organo-organoxysilanes of the present invention may also be prepared by ester interchange methods. The method involving the organohalosilanes, however, is preferred because it is more direct.

Specific examples of the alcohols and oxiranes which we prefer as the halogen-reactive constituent are:

Ethylene glycol
Propylene glycol
Diethylene glycol
Trimethylene glycol
Ethyl alcohol
n-Propyl alcohol
n-Butyl alcohol
Ethylene oxide
Propylene oxide (1,2)

It will be seen that the preferred halogen-reactive oxygen compounds are the hydrocarbon diols, hydrocarbon ether-diols, $C_2$ to $C_4$ alkanols, and oxiranes containing not more than three carbon atoms per molecule.

Specific examples of organohalosilanes which can be used in preparing the organo-organoxysilanes are as follows:

Ethyltrichlorosilane
Amyltrichlorosilane
Nonyltrichlorosilane
Hexadecyltrichlorosilane
Cyclohexyltrichlorosilane
Cyclohexenyltrichlorosilane
Beta-(3-cyclohexenyl)ethyltrichlorosilane
3-methyl-3-cyclohexenyltrichlorosilane
2-methyl-2-cyclohexenyltrichlorosilane
Undecenyltrichlorosilane
Diethyldichlorosilane The reaction between the organohalosilane and the halogen-reactive oxygen compound can be effected by merely commingling the two reactants under such conditions that they react with the formation of the desired organo-organoxysilane. In the case of an alcohol, the reaction is accompanied by the liberation of hydrogen halide in amount corresponding to the amount of halogen in the organohalosilane, the hydrogen of the hydrogen halide coming from the alcoholic hydroxyl groups. Provision should be made for removal of the gaseous hydrogen halide as formed, in ways well-known to those skilled in the art. Alternatively, we can effect the reaction in the presence of a suitable hydrogen halide acceptor or binder, usually an alkaline-reacting material, e. g., an alkaline earth carbonate, which neutralizes the hydrogen halide immediately upon its formation, thereby forcing the reaction toward completion. Typically, we use a reactor provided with stirring means, means for heating, means for refluxing, and a trap for removing the hydrogen halide gas. To this reactor we charge the alcohol and then gradually add the organohalosilane, with stirring. The reaction proceeds spontaneously with evolution of heat and hydrogen halide. After addition of the organohalosilane is complete we heat the reaction mixture to an elevated temperature (e. g. 200° C.) to accelerate the reaction and carry it to completion. The reaction mixture when withdrawn is then ready for used. Care should be taken, of course, to remove all traces of free hydrogen halide from the reaction mixture before use thereof, in order to give a product free from corrosive tendencies. The reaction is carried out at an elevated temperature which can range from 50° to 250° C. but commonly ranges from 150° to 225° C. Since the alcohol and the organohalosilane interact exothermically, a considerable portion of the reaction occurs during the period of intermixing.

The following is a typical method of reacting a dihydric alcohol with an organohalosilane to make products which can be used in accordance with our invention. The reaction is carried out in a three-necked flask, provision being made for stirring, refluxing, and the dropwise addition of the silane. A trap is provided to remove the hydrogen chloride formed during the reaction. To 159 g. of diethylene glycol, 202.5 g. of dodecyltrichlorosilane is added dropwise, with continuous stirring of the mixture. The reaction is accompanied by the evolution of heat and hydrogen chloride. After the addition of the silane has been completed, the reaction mixture is heated gradually up to 200° C. During this period further hydrogen chloride is driven off. The product is a slightly discolored liquid. Analysis shows it to contain only 0.72% of residual chlorine, indicating that the reaction has gone substantially to completion.

When a dihydric alcohol is used, we employ such relative proportions of alcohol and silane as to furnish an excess of hydroxyl groups present in the alcohol over chlorine atoms in the silane, so that the product will be a free flowing liquid rather than an insoluble gel. The ratio of equivalents of hydroxyl (from dihydric alcohol) to chlorine (from organotrihalosilane) should be greater than 1.3 to 1.0 and not greater than 2.0 to 1.0. The ratio of equivalents of hydroxyl (from dihydric alcohol) to chlorine (from organidichlorosilane) should be greater than 1.0 to 1.0 and not greater than 2.0 to 1.0. We generally use quantities of reactants in the ratio of about 1.5 hydroxyl to 1.0 chlorine.

When a monohydric alcohol is used we likewise prefer to employ an excess over theoretical in order to insure that the product be substantially free of residual chlorine.

When an oxirane is used, the same procedure as is described above for the alcohols can be followed except that there is no need to provide for removal of hydrogen chloride because the reaction liberates no hydrogen halide. When an oxirane is used, the reactants are simply brought together, the silane preferably being added gradually to the oxirane, after which the reaction mixture can be heated to an elevated temperature of the order indicated above to effect completion of the reaction. The theoretical proportions can be employed but we prefer to employ a slight excess of the oxirane over the organohalosilane in order to insure that the reaction product be substantially free of residual chlorine.

We believe that when one of the organo-organoxysilanes of the present invention is incorporated with the Butyl rubber and siliceous filler in accordance with our invention a reaction between the filler and the chemical takes place whereby a chemical linkage with the surface of the filler is brought about. It is believed that this reaction between the chemical and the filler involves the liberation of an alcohol or chlorohydrin (depending on whether an alcohol or an oxirane was used as the reactant in preparing the organo-organoxysilane) corresponding to the organoxy group in the organo-organoxysilane and that the reaction simultaneously effects chemical combination of the residue of the organo-organoxysilane with the surface of the filler and that the latter effect is responsible for the enhanced reinforcing properties conferred on the filler.

When a glycol was used as the reactant in making the organo-organoxysilane, this glycol is liberated by the reaction between the chemical and filler. When a monohydric alcohol was used, we believe that it is evolved in the reaction with the filler. When an oxirane was used, since no hydrogen halide was evolved in making the reaction product, we believe that the corresponding alkylene chlorohydrin is evolved during the reaction with the filler. Thus with ethylene oxide it is thought that ethylene chlorohydrin is liberated.

The convenience of our method of treating silica or silicate fillers will be evident to those skilled in the art. Our method involves little additional material handling and is economical. Incorporation of the organo-organoxysilanes reaction products is especially convenient because of their low volatility and their liquid form which enable them to be added by ordinary rubber compounding techniques and by the use of conventional rubber-compounding equipment.

In practicing our invention we find it highly desirable to intermix the elastomer, the siliceous filler, and the organo-organoxysilane intimately at an elevated temperature before incorporating the zinc oxide commonly used to promote vulcanization.

The evidence indicates that zinc oxide reacts rapidly with the organo-organoxysilane used in the practice of our invention and that this side reaction interferes with the desired reaction, viz., that of the organo-organoxysilane with the surface of the siliceous filler. If the zinc oxide is incorporated prior to mixing of the organo-organoxysilane and the filler with the elastomer, the resulting vulcanized product has a much lower modulus than the vulcanized product obtained when the preferred order of incorporating the compounding ingredients, viz., delaying the addition of the zinc oxide until after the organo-organoxysilane has been intimately mixed at an elevated temperature. Other physical properties are affected adversely also.

The amount of the organo-organoxysilane employed can vary within wide limits. Typically, we employ 1 to 6% by weight of the organo-organoxysilane based on the weight of filler used. Such amounts of the silanes suffice to effect treatment of the surface of the filler and to produce the improved results of the invention. We can use even greater amounts of the organo-organoxysilane, ranging as high as 10% of the weight of the filler.

A wide variety of fillers can be employed in the practice of our invention. We may employ precipitated hydrated silicas of very fine particle size such as the material known commercially as "Hi-Sil" which has a particle size of about 200 Angstrom units and a surface area of 150 square meters per gram, and contains 10.7% of water of hydration, corresponding to 0.073 gram of water per 100 square meters of surface area. Another form of hydrated silica of the same general type is one obtained by precipitation from an aqueous colloidal dispersion of silica known commercially as "Ludox," the silica derived therefrom having a particle size of about 250 Angstrom units and a surface area of 125 square meters per gram, and containing 5.6% of water of hydration, corresponding to 0.046 gram of water per 100 square meters of surface area.

We have obtained satisfactory results with a precipitated hydrated calcium silicate having a particle size of about 300 Angstrom units and sold commercially as "Silene EF," which contains about 13 to 19% of water of hydration, as determined by ashing. Another filler which we have successfully used is kaolin such as that known commercially as "Suprex" clay which has plate-like particles of a wide distribution of sizes averaging approximately 5,000 Angstrom units and containing 14% of water of hydration.

In the practice of our invention we can use any silica, calcium silicate or kaolin having the particle size and water of hydration specified hereinafter. One of the most important features of our invention is that it enables the use of kaolin in applications where heretofore more highly reinforcing and more costly fillers were necessary. This is especially advantageous because of the low cost of kaolin.

It is important to note that the fillers should not be dried at a materially elevated temperature before incorporation with the Butyl rubber and the organo-organoxysilane. We have found that drying of the filler impairs its response to treatment with the chemical and its ability to give an improved vulcanizate. We believe that this is due to the fact that drying, by which we mean heating at an elevated temperature under such conditions as to remove appreciable amounts of water from the filler, reduces the ability of the filler to respond to the treatment of the invention by reducing the amount of water of hydration contained therein. We believe that the water of hydration manifested on the surfaces of the filler particles is essential to the operability of the invention. We believe that the chemical combination of the residue of the organo-organoxysilane with the filler is responsible for the improvement in physical properties of the vulcanizates.

In the practice of our invention, we employ fillers which can be defined as being composed of silica, calcium silicate or kaolin having an average particle size not greater than 10 microns and a degree of hydration not less than that represented by 0.02 gram of moisture per 100 square meters of surface area. According to calculations based upon the assumption that the packing of water on a surface is equal to that in liquid water, a monomolecular surface film of water would weigh about 0.03 gram per 100 square meters of surface area.

Whether the so-called "water of hydration" is chemically bound to or physically held by the filler is of theoretical interest only. Regardless of the exact manner in which the water is bound, it is so tightly held that the beneficial effects of treatment of the filler with the organo-organoxysilane are obtained. Actually, part of the water may be chemically bound while the rest is physically held. We measure the amount of water of hydration by determining loss of weight upon ignition and assume that the figure thus obtained represents the amount of water available.

As indicated above, we prefer to mix the Butyl rubber, filler and organo-organoxysilane at elevated temperatures in order to effect maximum reaction between the chemical and the filler. A convenient method of effecting the reaction is to use an internal mixer in which temperatures of approximately 250–400° F. are developed. Temperatures in this range are quite adequate to cause our reaction to go substantially to completion within a few minutes. In the laboratory where it is a common practice to use open mills for combining the rubber and filler we have found it sufficient to mill the rubber and filler and the chemical for 10 minutes at 300° F., thus approximating factory conditions.

The following examples will illustrate the invention more fully. The data on physical properties reported in these examples were obtained at room temperature unless otherwise noted. Stress-strain properties were measured by conventional ASTM methods. The stress at 300% elongation has been taken as a measure of modulus. Set was determined at break after 30 seconds rather than after 10 minutes as recommended by ASTM. Hysteresis results were determined at 280° F. on a torsional hysterometer (see M. Mooney and R. H. Gerke, India Rubber World, 103, 29 (1941)). Durometer hardness was measured as Shore A Durometer after 5 seconds.

EXAMPLE 1

Organo-organoxysilanes prepared by reacting diethylene glycol and various organohalosilanes in the manner described above were incorporated in Butyl rubber stock containing "Hi-Sil" silica. The formulation was as follows:

| | Parts by weight |
|---|---|
| Butyl rubber | 100 |
| "Hi-Sil" silica | 54 |
| Stearic acid | 1 |
| Organo-organoxysilanes reaction product | 4 |
| Zinc oxide | 5 |
| Accelerators | 2.5 |
| Sulfur | 1.5 |

The Butyl rubber, the "Hi-Sil" silica and the organo-organoxysilane were blended on a cold mill and then milled for 10 minutes at 300° F. after which the other ingredients were blended on a cold mill. The control simply omitted the organo-organoxysilane. The stocks were cured for 40 minutes at 307° F. The data were as follows:

| Organo-organoxysilane: Reaction product of diethylene glycol and— | Durometer | Tors. Hyst. at 280° F. | Tensile | Elong. | Stress at 300% |
|---|---|---|---|---|---|
| No reaction product | 55 | .344 | 1,580 | 720 | 385 |
| Diethyldichlorosilane | 47 | .214 | 1,640 | 640 | 425 |
| Amyltrichlorosilane | 48 | .146 | 1,620 | 550 | 525 |
| Nonyltrichlorosilane | 48 | .117 | 1,650 | 650 | 425 |
| Cyclohexyltrichlorosilane | 45 | .096 | 1,670 | 680 | 400 |

From Table I it will be seen that the organo-organoxysilanes formed by reacting the aliphatic saturated organochlorosilanes with diethylene glycol gave a marked reduction in hysteresis, the greater effect being obtained with the organo-organoxysilanes made with the higher molecular weight silanes. The reaction product made from cyclohexyltrichlorosilane gave excellent results.

EXAMPLE 2

The effect of varying the amount of the organo-organoxysilane is illustrated in this example. The reaction product of diethylene glycol and diethyldichlorosilane was added in varying amounts to a Butyl rubber stock filled with "Hi-Sil" silica. The formulation was as follows:

| | Parts by weight |
|---|---|
| Butyl rubber | 100 |
| "Hi-Sil" silica | 54 |
| Diethyldichlorosilane/diethylene glycol reaction product | As indicated |
| Stearic acid | 1 |
| Zinc oxide | 3 |
| Accelerators | 2.5 |
| Sulfur | 1.5 |

The data were as follows:

Table II

| Parts reaction product of diethyldichlorosilane and diethylene glycol | Durometer | Tensile | Elong. | Stress at 300% | Tors. Hyst. at 280° F. |
|---|---|---|---|---|---|
| 0 | 52 | 1,980 | 810 | 335 | .310 |
| 2 | 53 | 2,260 | 750 | 390 | .227 |
| 4 | 50 | 2,020 | 730 | 365 | .165 |
| 6 | 50 | 1,850 | 670 | 350 | .135 |

The mixes were made in an internal mixer. The Butyl rubber, "Hi-Sil" silica and reaction product were blended for three minutes at about 200° F. Mixing was continued for an additional nine minutes at 300° F. The other compounding ingredients were then incorporated on a cold mill. The cure was for 40 minutes at 307° F.

It is evident from the data just given that substantial improvements were obtained with two parts of the organo-organoxysilane and that amounts thereof greater than two parts, per 100 of Butyl rubber, gave additional improvement.

Examples 1 and 2 show specifically how the reaction products of saturated aliphatic hydrocarbon halosilanes and diethylene glycol, and the reaction products of saturated cycloaliphatic hydrocarbon halosilanes and diethylene glycol, cause a marked reduction of the hysteresis of Butyl stock containing "Hi-Sil" silica. Similarly, organo-organoxysilanes prepared from saturated aliphatic hydrocarbon halosilanes or saturated cycloaliphatic hydrocarbon halosilanes and halogen-reactive materials other than diethylene glycol, and selected from the group consisting of saturated aliphatic monohydric alcohols, saturated aliphatic dihydric alcohols, and oxiranes, cause the same improvements in hysteresis as those demonstrated in Examples 1 and 2. Although "Hi-Sil" silica was used in Examples 1 and 2, other fine-particle hydrated silicas and silicates, such as the commercial materials precipitated "Ludox" and "Silene EF," can be used also. The reaction products of saturated aliphatic hydrocarbon halosilanes or saturated cycloaliphatic hydrocarbon halosilanes and the appropriate halogen-reactive materials are most effective in improving the hysteresis of Butyl stocks containing the fine-particle siliceous fillers, such as those having particle diameters of 0.1 micron or less.

Improved Butyl stocks can also be obtained by the use of organo-organoxysilanes which are prepared from the certain unsaturated hydrocarbon halosilanes. These unsaturated organo-organoxysilanes are products of the reaction of (a) an organohalosilane selected from the group consisting of cycloalkenylhalosilanes, cycloalkenylalkylhalosilanes, and omega-alkenylhalosilanes, in which the alkenyl group contains at least 6 carbon atoms, with (b) a halogen-reactive material selected from the group consisting of saturated monohydric alcohols, saturated dihydric alcohols, and oxiranes. They impart to Butyl stocks containing siliceous fillers an increase in modulus, an increase in high temperature tensile strength, and a decrease in permanent set, as well as a decrease in hysteresis. These improvements are imparted to Butyl stocks containing either fine-particle siliceous fillers such as "Hi-Sil" silica, or the larger-particle siliceous fillers such as kaolin.

The following examples show the effect of using several different unsaturated organo-organoxysilanes according to the method of this invention to improve the properties of Butyl stocks filled with kaolin and "Hi-Sil" silica.

EXAMPLE 3

The organo-organoxysilanes formed by reacting cyclohexenyltrichlorosilane with several different halogen-reactive materials were incorporated in Butyl stocks containing the kaolin known commercially as "Crown" clay. The formulation was as follows:

Parts by weight
Butyl rubber ------------------------------------ 100
"Crown" clay ----------------------------------- 72
Stearic acid ------------------------------------ 1
Organo-organoxysilane -------------------------- 2
Zinc oxide -------------------------------------- 3
Accelerators ----------------------------------- 2.5
Sulfur ----------------------------------------- 1.5

The stocks were mixed by blending the Butyl rubber, clay, stearic acid and organo-organoxysilane on a cold mill, then milling the blended mixture for 10 minutes at 300° F., after which the other ingredients were incorporated on a warm mill. The stocks were cured for 60 minutes at 307° F. The data were as follows:

Table III

| Silane Used | Tensile | Elong. | Set at Break | Stress at 300% | 212° F. Tensile | 280° F. Torsional Hysteresis |
| --- | --- | --- | --- | --- | --- | --- |
| None (Control) | 1,120 | 550 | 50 | 425 | 330 | .157 |
| Reaction product of propylene glycol and cyclohexenyltrichlorosilane | 1,160 | 420 | 31 | 880 | 600 | .078 |
| Cyclohexenyltri-2-chloroethoxysilane | 1,280 | 460 | 34 | 850 | 555 | .087 |
| Cyclohexenyltri-2-chloropropoxysilane | 1,220 | 490 | 33 | 825 | 535 | .088 |
| Cyclohexenyltri-n-butoxysilane | 1,160 | 410 | 28 | 910 | 525 | .082 |

It will be observed from the data in Table III that the use of cyclohexenylorganoxysilanes imparted substantial improvements to the Butyl stocks. The stocks had lower hysteresis, increased tensile strength (particularly at high temperatures), increased modulus, and reduced permanent set.

EXAMPLE 4

The reaction product of beta-(3-cyclohexenyl)ethyltrichlorosilane and diethylene glycol was incorporated into a Butyl stock containing "Hi-Sil" silica. The formulation was as follows:

Parts by weight
Butyl rubber ------------------------------------ 100
"Hi-Sil" silica ---------------------------------- 54
Stearic acid ------------------------------------ 1
Organo-organoxysilane -------------------------- 4
Zinc oxide -------------------------------------- 3
Accelerators ----------------------------------- 2.5
Sulfur ----------------------------------------- 1.5

The stock, along with a control stock containing no silane, was mixed and cured similarly to the stocks in Example #3. The data were as follows:

Table IV

| Amount of Organo-organoxysilane | Tensile | Elong. | Set at Break | Stress at 300% | 212° F. Tensile | Tors. Hyst. at 280° F. |
| --- | --- | --- | --- | --- | --- | --- |
| None (control) | 1,730 | 750 | 49 | 360 | 760 | .275 |
| 4 parts | 1,880 | 570 | 24 | 920 | 900 | .157 |

The data show that the improvements brought about by the use of the beta-(cyclohexenyl)ethylsilane reaction product with "Hi-Sil" silica were similar to those obtained in Example 3 by the use of the cyclohexenylsilane reaction product with kaolin.

In order to get the improvements in physical properties as demonstrated in Examples 3 and 4, it is necessary to use organo-organoxysilanes containing olefinic unsaturation. (It is believed that the unsaturated silane not only becomes attached to the filler surface, as described above, but also becomes attached to the Butyl rubber through co-vulcanization therewith, and that this co-vulcanization is largely responsible for the improvements obtained in physical properties.) However, not all unsaturated organo-organoxysilanes are equally good in this respect. As indicated already, superior results are obtained with those unsaturated organo-organoxysilanes which are products of reaction of (a) an organohalosilane selected from the group consisting of cycloalkenylhalosilanes, cycloalkenylhalosilanes, and omega-alkenylhalosilanes in which the alkenyl group consists of at least 6 carbon atoms; with (b) a halogen-reactive material selected from the group consisting of saturated monohydric alcohols, saturated dihydric alcohols, and oxiranes. If the organohalosilane used in preparing the organo-organoxysilane reaction products is either a vinyl- or an allyl-halosilane, unsatisfactory results are obtained. The following example gives a comparison of the effect of a cyclohexenylorganoxysilane and a vinylorganoxysilane on the physical properties of Butyl stocks containing siliceous fillers.

EXAMPLE 5

The organo-organoxysilanes formed by reacting vinyltrichlorosilane with diethylene glycol, and by reacting cyclohexenyltrichlorosilane with diethylene glycol, were incorporated into Butyl stocks containing "Hi-Sil" silica. The formulations were as follows:

| | Parts by weight |
|---|---|
| Butyl rubber | 100 |
| "Hi-Sil" silica | 54 |
| Organo-organoxysilane | As indicated |
| Stearic acid | 1 |
| Zinc oxide | 5 |
| Accelerators | 2.1 |
| Sulfur | 1.5 |

The stocks were mixed by blending the Butyl rubber, filler, stearic acid and the organo-organoxysilane on a cold mill, then milling the blended mixture for 10 minutes at 300° F., after which the other ingredients were incorporated on a warm mill. The stocks were cured for 40 minutes or for 60 minutes at 307° F., identical curing times being employed for the controls and the test stocks. The data were as follows:

Table V

| Organo-organoxysilane | Tensile | Elong. | Set at Break | Stress at 300% | 212° F. Tensile | Tors. Hyst. at 280° F. |
|---|---|---|---|---|---|---|
| 4 pts. of the vinyl product | 2,130 | 740 | 36 | 475 | | .302 |
| None (control) | 1,980 | 810 | 44 | 335 | | .310 |
| 3 pts. of the cyclohexenyl product | 1,760 | 540 | 28 | 950 | 930 | .321 |
| None (Control) | 1,600 | 820 | 63 | 390 | 825 | .367 |

It is evident from the data in Table V that the vinylsilane reaction product was not nearly as effective in increasing the modulus and reducing the permanent set as was the cyclohexenylsilane reaction product. The vulcanizate containing the vinylsilane reaction product was black and apparently had cured separated into two distinct phases. The data demonstrated again, as in Example 4, that unsaturated silanes having ring unsaturation impart to Butyl stocks containing "Hi-Sil" silica improvements similar to those shown in Table III for Butyl stocks containing kaolin.

To recapitulate, the saturated organo-organoxysilanes formed by reacting saturated organohalosilanes with halogen-reactive materials, as described herein, effect a marked reduction in the stiffening action of precipitated hydrated silica or calcium silicate fillers of very fine particle size (less than 0.1 micron) in Butyl rubber, thereby overcoming the objectionable stiffness of vulcanizates containing such fillers. Such silanes give a considerable improvement in flexibility manifested by a considerably lower torsional hysteresis and hardness. The incorporation of these organo-organoxysilanes in stocks containing fillers of such fine particle size makes it possible to use such stocks in many applications for which they have not been heretofore considered usable.

Further, the organo-organoxysilanes formed by reacting unsaturated organohalosilanes from the group consisting of cycloalkenylhalosilanes, cycloalkenylalkylhalosilanes, and omega-alkenylhalosilanes in which the alkenyl group contains at least 6 carbon atoms, with the halogen reactive materials described in this invention, impart to vulcanized Butyl stocks containing hydrated siliceous fillers marked improvements in properties. Specifically they impart improvements in tensile strength (particularly hot tensile strength), increase in modulus, reduction in permanent set, and reduction in hysteresis. The hydrated siliceous fillers which may be used in Butyl to obtain the advantages described, include hydrated precipitated silica, such as the commercial material known as "Hi-Sil," hydrated calcium silicates such as the commercial material known as "Silene EF" and kaolins such as "Suprex" clay or "Crown" clay.

Carbon black has heretofore been considered the outstanding reinforcing filler. The present invention effects such improvement in the reinforcing properties of the silica, calcium silicate and kaolin fillers as to cause them to approach and in some respects surpass carbon blacks of comparable particle size. Thus, the present invention permits the substitution of silica, calcium silicate and kaolin fillers in many applications where carbon black has been required heretofore. The invention can be used in the manufacture of rubber footwear, belting, wire insulation, colored inner tubes, tires (especially white and colored sidewalls), and miscellaneous molded rubber goods. A highly desirable advantage of the use of the silica, calcium silicate and kaolin fillers is that they enable the rubber manufacturer to produce high quality products over the whole color range without restriction as to color. Another advantage is that the electrical resistance of stocks filled with these fillers is much higher than that of stocks filled with carbon black. Consequently, where good electrical insulating characteristics are required, the use of silica, calcium silicate and kaolin fillers in accordance with the invention will be preferable to the use of carbon black.

From the foregoing description, many advantages of our invention will be apparent to those skilled in the art. The principal advantage is that the invention provides a simple, economical and highly advantageous method of treatment of silica, calcium silicate and kaolin fillers to improve their reinforcing characteristics. Another advantage is that the treatment of the invention is accomplished without introducing any objectionable complication into the rubber compounding technique. Many other advantages of the invention will be apparent to those skilled in the art.

This application is a continuation-in-part of our co-pending application, Serial No. 250,788, filed October 10, 1951, and allowed October 27, 1954, and now abandoned. The instant application supplants our co-pending application Serial No. 365,540, filed July 1, 1953, and allowed August 4, 1954, and now abandoned, said application Serial No. 365,540 is a division of the aforementioned application Serial No. 250,788.

Having thus described our invention, what we claim and desire to protect by Letters Patent is:

1. The method which comprises masticating to uniformity a mixture of (A) a halogen-free, liquid reaction product of a hydrocarbon halosilane and an excess of an aliphatic oxygen compound, (B) a rubbery copolymer of from 80 to 99.5% of isobutylene and correspondingly from 20 to 0.5% of an aliphatic conjugated diolefin, and (C) a filler selected from the group consisting of precipitated hydrated silica, precipitated hydrated calcium silicate, and kaolin, said filler having an average particle size not greater than 10 microns and a degree of hydration corresponding to not less than 0.02 gram of moisture per 100 square meters of surface area, and heating the said mixture at a temperature of at least 250° F. to effect reaction between said reaction product and said filler to form a chemical linkage with the surface of said filler and said halosilane being selected from the group consisting of saturated aliphatic and cycloaliphatic hydrocarbon halosilanes, cycloalkenylhalosilanes, cycloalkenylalkylhalosilanes, and omega-alkenylhalosilanes wherein the alkenyl group contains at least six carbon atoms, and said oxygen compound being selected from the group consisting of saturated aliphatic monohydric and dihydric alcohols, and oxiranes having the formula $$R-CH-CH_2 \atop \diagdown O \diagup$$

wherein R is selected from the group consisting of hydrogen, methyl, and ethyl, the said reaction product being present in amount of from 1 to 10% of the weight of the filler.

2. A vulcanizate of the product of claim 1.

3. The method which comprises masticating to uniformity a mixture of (A) a halogen-free, liquid reaction product of a hydrocarbon halosilane and an excess of an aliphatic dihydric alcohol, (B) a rubbery copolymer of from 80 to 99.5% of isobutylene and correspondingly from 20 to 0.5% of an aliphatic conjugated diolefin, and (C) a filler selected from the group consisting of precipitated hydrated silica, precipitated hydrated calcium silicate and kaolin, said filler having an average particle size not greater than 10 microns and a degree of hydration corresponding to not less than 0.02 gram of moisture per 100 square meters of surface area, and heating the said mixture at a temperature of at least 250° F. to effect reaction between said reaction product and said filler to form a chemical linkage with the surface of said filler and release said aliphatic dihydric alcohol, said halosilane being selected from the group consisting of aliphatic saturated hydrocarbon halosilanes, cycloaliphatic saturated hydrocarbon halosilanes, cycloalkenylhalosilanes, cycloalkenylalkylhalosilanes and omega-alkenylhalosilanes in which the alkenyl group contains at least 6 carbon atoms, the said reaction product being present in amount of from 1 to 10% of the weight of the filler.

4. The method of claim 3 wherein other compounding ingredients including zinc oxide and sulfur are incorporated with the mixture subsequent to said heating, whereupon the mixture is vulcanized.

5. The method which comprises masticating to uniformity a mixture of (A) a halogen-free, liquid reaction product of a hydrocarbon halosilane and an excess of an aliphatic dihydric alcohol, (B) a rubbery copolymer of from 80 to 99.5% of isobutylene and correspondingly from 20 to 0.5% of an aliphatic conjugated diolefin, and (C) a filler composed of precipitated hydrated silica having an average particle size not greater than 10 microns and a degree of hydration corresponding to not less than 0.02 gram of moisture per 100 square meters of surface area, and heating the said mixture at a temperature of at least 250° F. to effect reaction between said reaction product and said filler to form a chemical linkage with the surface of said filler and release said aliphatic dihydric alcohol, said halosilane being selected from the group consisting of aliphatic saturated hydrocarbon halosilanes, cycloaliphatic saturated hydrocarbon halosilanes, cycloalkenylhalosilanes, cycloalkenylalkylhalosilanes and omega-alkenylhalosilanes in which the alkenyl group contains at least 6 carbon atoms, the said reaction product being present in amount of from 1 to 10% of the weight of the filler.

6. The method which comprises masticating to uniformity a mixture of (A) a halogen-free, liquid reaction product of a hydrocarbon halosilane and an excess of an aliphatic dihydric alcohol, (B) a rubbery copolymer of from 80 to 99.5% of isobutylene and correspondingly from 20 to 0.5% of an aliphatic conjugated diolefin, and (C) a filler composed of precipitated hydrated calcium silicate having an average particle size not greater than 10 microns and a degree of hydration corresponding to not less than 0.02 gram of moisture per 100 square meters of surface area, and heating the said mixture at a temperature of at least 250° F. to effect reaction between said reaction product and said filler to form a chemical linkage with the surface of said filler and release said aliphatic dihydric alcohol, said halosilane being selected from the group consisting of aliphatic saturated hydrocarbon halosilanes, cycloaliphatic saturated hydrocarbon halosilanes, cycloalkenylhalosilanes, cycloalkenylalkylhalosilanes and omega-alkenylhalosilanes in which the akenyl group contains at least 6 carbon atoms, the said reaction product being present in amount of from 1 to 10% of the weight of the filler.

7. The method which comprises masticating to uniformity a mixture of (A) a halogen-free, liquid reaction product of a hydrocarbon halosilane and an excess of an aliphatic dihydric alcohol, (B) a rubbery copolymer of from 80 to 99.5% of isobutylene and correspondingly from 20 to 0.5% of an aliphatic conjugated diolefin, and (C) a filler composed of kaolin having an average particle size not greater than 10 microns and a degree of hydration corresponding to not less than 0.02 gram of moisture per 100 square meters of surface area, and heating the said mixture at a temperature of at least 250° F. to effect reaction between said reaction product and said filler to form a chemical linkage with the surface of said filler and release said aliphatic dihydric alcohol, said halosilane being selected from the group consisting of aliphatic saturated hydrocarbon halosilanes, cycloaliphatic saturated hydrocarbon halosilanes, cycloalkenylhalosilanes, cycloalkenylalkylhalosilanes and omega-alkenylhalosilanes in which the alkenyl group contains at least 6 carbon atoms, the said reaction product being present in amount of from 1 to 10% of the weight of the filler.

8. The method which comprises commingling a reaction product of cyclohexenyltrichlorosilane and an excess of diethylene glycol which is a free flowing liquid at ambient temperatures and contains substantially no hydrolyzable halogen with a rubbery copolymer of from 80 to 99.5% of isobutylene and correspondingly from 20 to 0.5% of an aliphatic conjugated diolefin and a filler composed of precipitated hydrated silica having an average particle size not greater than 10 microns and a degree of hydration corresponding to not less than 0.02 gram of moisture per 100 square meters of surface area, the amount of said reaction product being equal to from 1 to 10% by weight based on said filler, and masticating the mixture at a temperature of at least 250° F. to effect reaction of said reaction product with said filler to form a chemical linkage with the surface of said filler and release said diethylene glycol, thereafter admixing other compounding ingredients including zinc oxide and sulfur with the resulting mixture, and vulcanizing the resulting mixture.

No references cited.